United States Patent
Angelopoulos et al.

(10) Patent No.: US 7,561,873 B2
(45) Date of Patent: Jul. 14, 2009

(54) MOBILE HANDSET AS TTY DEVICE

(75) Inventors: Anthanasios Angelopoulos, San Diego, CA (US); Aaron Teague, Victorville, CA (US)

(73) Assignee: Kyocera Wireless Corp., San Diego, CA (US)

( * ) Notice: Subject to any disclaimer, the term of this patent is extended or adjusted under 35 U.S.C. 154(b) by 557 days.

(21) Appl. No.: 10/665,608

(22) Filed: Sep. 19, 2003

(65) Prior Publication Data

US 2005/0064899 A1    Mar. 24, 2005

(51) Int. Cl.
*H04M 3/42*    (2006.01)
*H04M 11/00*   (2006.01)
*H04L 29/08*   (2006.01)
*H04W 4/00*    (2009.01)

(52) U.S. Cl. ............ 455/414.4; 455/414.1; 455/432.2; 379/52; 379/93.15; 379/93.26

(58) Field of Classification Search ............ 455/414.1, 455/418, 432.2, 414.4; 379/52, 93.15, 93.26, 379/88.14
See application file for complete search history.

(56) References Cited

U.S. PATENT DOCUMENTS

| | | | |
|---|---|---|---|
| 4,268,721 A * | 5/1981 | Nielson et al. ................. | 379/52 |
| 5,604,786 A | 2/1997 | Engelke et al. | |
| 5,940,475 A | 8/1999 | Hansen | |
| 6,002,749 A | 12/1999 | Hansen et al. | |
| 6,078,650 A | 6/2000 | Hansen | |
| 6,181,736 B1 * | 1/2001 | McLaughlin et al. ........ | 375/222 |
| 6,205,339 B1 | 3/2001 | Leung et al. | |
| 6,212,412 B1 * | 4/2001 | Rogers et al. ............ | 455/575.1 |
| 6,307,921 B1 | 10/2001 | Engelke et al. | |
| 6,385,463 B1 * | 5/2002 | Lieberman et al. .......... | 455/557 |
| 6,493,558 B1 * | 12/2002 | Bernhart et al. ............ | 455/466 |
| 6,668,043 B2 * | 12/2003 | Hyziak et al. .................. | 379/52 |
| 6,983,171 B2 * | 1/2006 | Van Bosch et al. .......... | 455/557 |
| 7,002,553 B2 * | 2/2006 | Shkolnikov ................. | 345/169 |
| 2002/0085703 A1 * | 7/2002 | Proctor .................. | 379/265.02 |
| 2003/0053603 A1 * | 3/2003 | Vejlgaard ...................... | 379/52 |
| 2003/0069997 A1 * | 4/2003 | Bravin et al. ................. | 709/250 |
| 2004/0127233 A1 * | 7/2004 | Harris et al. ................. | 455/458 |
| 2004/0137944 A1 * | 7/2004 | Lee et al. ..................... | 455/557 |
| 2004/0228325 A1 * | 11/2004 | Hepworth et al. ........... | 370/352 |

OTHER PUBLICATIONS

U.S. Federal Communications Commission, Revision of the Commission's Rules to Ensure Compatibility with Enhanced 911 Emergency Calling Systems, Adopted Dec. 11, 2000, Released Dec. 14, 2000.

* cited by examiner

*Primary Examiner*—Nay A Maung
*Assistant Examiner*—Andrew Wendell

(57) ABSTRACT

A mobile communication device 10 for converting between alphanumeric data and TTY formatted data. A conversion table 20, 40 is stored in a memory associated with microprocessor 16 of mobile 10. Microprocessor 16 converts alphanumeric characters input by a user to TTY formatted data for transmission in digital mode. TTY formatted signals that are received by mobile 10 are converted to alphanumeric data by TTY decoder 26 and microprocessor 16 for display on mobile display 14. In analog mode, tone generator 44 produces a Baudot tone formatted signal for transmission from mobile 10. Tone detector 46 detects Baudot tone formatted signals received in analog mode. Microprocessor 16 converts the Baudot tone formatted signals to alphanumeric data for display on display 14.

11 Claims, 2 Drawing Sheets

MOBILE HANDSET AS TTY DEVICE

BACKGROUND OF THE INVENTION

1. Field of the Invention (Technical Field)

The present invention relates generally to the field of communication processes and devices for hearing and/or speech impaired individuals, and in particular to the field of TTY communications over wireless mobile communication devices.

2. Background Art

Hearing impaired and/or speech impaired individuals rely on a variety of communications devices to communicate. Statutes, such as the Americans with Disabilities Act and the Telecommunications Act, provide that telecommunications service providers and telecommunication device manufacturers enhance communication devices such that hearing and/or speech impaired individuals can communicate effectively over existing telecommunication networks.

Many hearing and/or speech impaired individuals communicate with other individuals over existing landline telephone networks primarily via a Telecommunication Device for the Deaf (TDD), which consists of an alphanumeric keyboard and display, or teletypewriter (TTY), that is connected to the telephone through a modem. When a user enters alphanumeric characters on the TTY, tones corresponding to the characters are transmitted via the modem through the telephone line to a receiving TDD. At the receiving TDD, the tones are received by a second modem and converted back to characters to be read by the receiving party on a TTY. A conversation proceeds by taking turns in real time, where the users type messages back and forth over TDDs.

Each character is transmitted and received via a TTY format, most commonly the Baudot/Weitbrecht (hereafter "Baudot") tone format. In the Baudot format, transmitted tones include a mark tone of 1,400 Hz and a space tone of 1,800 Hz. Serial sequences of marks and spaces provide five-bit binary numbers representing a limited set of characters, including letters of the alphabet, numerical digits, punctuation marks, and space characters. A typical TTY can support 32 characters as shown in Table 1 below. These five-bit words are transmitted over telephone lines at approximately 45.45 or 50 baud.

TABLE 1

| Code Signals • Denotes possible current | | | | | | | LTRS Shift | FIGS Shift | |
|---|---|---|---|---|---|---|---|---|---|
| | | | | | | | | CCITT Standard International Telegraph Alphabet No. 2 Used for Telex | North American Teletype Commercial Keyboard |
| Start | 1 | 2 | 3 | 4 | 5 | Stop | | | |
| • | • | • | | | | • | A | — | — |
| • | • | | | • | • | • | B | ? | ? |
| • | | • | • | • | | • | C | : | : |
| • | • | | | • | | • | D | Who are you? | $ |
| • | • | | | | | • | E | 3 | 3 |
| • | • | | • | • | | • | F | Note 1 | ! |
| • | | • | | • | • | • | G | Note 1 | & |
| • | | | • | | • | • | H | Note 1 | # |
| • | | • | • | | | • | I | 8 | 8 |
| • | • | • | | • | | • | J | Bell | Bell |
| • | • | • | • | • | | • | K | ( | ( |
| • | | • | | | • | • | L | ) | ) |
| • | | | • | • | • | • | M | . | . |
| • | | | • | • | | • | N | ' | , |
| • | | | | • | • | • | O | 9 | 9 |
| • | | • | • | | • | • | P | 0 | 0 |
| • | • | • | • | | • | • | Q | 1 | 1 |
| • | | • | | • | | • | R | 4 | 4 |
| • | • | | • | | | • | S | ' | ' |
| • | | | | | • | • | T | 5 | 5 |
| • | • | • | • | | | • | U | 7 | 7 |
| • | | • | • | • | • | • | V | = | ; |
| • | • | • | | | • | • | W | 2 | 2 |
| • | • | | • | • | • | • | X | / | / |
| • | • | | • | | • | • | Y | 6 | 6 |
| • | • | | | | • | • | Z | + | " |
| | | | | | | • | Blank | | |
| • | • | • | • | • | • | • | Letters shift (LTRS) | | |
| • | • | | • | • | • | • | Figures shift (FIGS) | | |
| • | | | • | | | • | Space | | |
| • | | | | • | | • | Carriage return | | |
| • | | • | | | | • | Line feed | | |

With the advent of mobile communication devices, such as mobile cellular and satellite telephones, pagers, personal digital assistants (PDAs), and the like (hereafter "mobiles"), the Federal Communications Commission (FCC) requires that every mobile manufactured be capable of communicating TTY 911 emergency calls. In order to facilitate the development of TTY communication over digital wireless communication systems in particular, wireless carriers formed the "TTY Forum" in 1997, participants of which included consumers, representatives from government emergency centers, wireless product manufacturers and service providers, and TTY equipment manufacturers. In response to this directive, mobile manufacturers have provided mobiles with the ability to communicate with TTY devices.

Currently, to communicate TTY data via a mobile, an external TTY device must be connected to the mobile through the mobile audio jack. Once the TTY is connected to the mobile, the mobile is set by the user to operate in TTY mode, so that the mobile will transmit and receive data in the TTY data format. The TTY generates tones based upon alphanumeric characters input by the user. The mobile detects these tones through the audio jack. The tones are then transmitted to the receiving mobile over conventional mobile communication means, typically via wireless radio frequency (rf) transmission. To transmit the Baudot tones, the data is encoded with the appropriate TTY packet data extension so that the telecommunications base station and receiving mobile will interpret the incoming signal as a TTY signal. When a mobile receives a TTY signal, a decoder decodes the signal and sends the data to a tone regenerator. These tones are sent back to a TTY device for decoding and display to the receiving user.

One difficulty with TTY communication over mobiles, expressed by consumer advocates, is that in certain mobiles, direct connection through the audio jack blocks access to the microphone in the mobile preventing the user from efficiently alternating between receiving TTY and speaking during a call. Without some means of switching modes in this circumstance, a voice carry over (VCO) user must disconnect the audio cable every time it is the user's turn to speak. Voice carry over is a form of telecommunications relay service where a person with a hearing disability is able to speak directly to the other user, rather than sending data via a TTY. A communications assistant types the response from the other user back to the person with the hearing disability who reads the response from a TTY.

Another difficulty with connecting a TTY device through the mobile audio jack is that some mobiles do not permit simultaneous connection of the audio jack and the mobile power adapter. The audio jack may be located too close to the access point for the power cord, preventing the TTY user from making a call while the mobile is connected to a power outlet.

SUMMARY OF THE INVENTION (DISCLOSURE OF THE INVENTION)

A primary object of the present invention is to provide a mobile capable of receiving alphanumeric data input by the mobile user on the mobile and converting that data into TTY formatted data for transmission over a mobile communication system, eliminating the requirement of an external TTY device connected to the mobile. Another primary object of the present invention is to provide a mobile capable of receiving TTY formatted data and converting it into alphanumeric data for display on the mobile display to the user.

The present invention is a mobile communication device having TTY communication capability. A microprocessor operating in the mobile communication device converts between alphanumeric data and TTY formatted data appropriate for transmission or reception by the mobile communication device.

A primary advantage of the present invention is that hearing and/or speech impaired individuals can communicate over mobiles without connecting an external TTY device to the mobile. Users can enter alphanumeric data on the mobile keypad for transmission, and can read received TTY formatted data as alphanumeric characters on the mobile display.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate a preferred embodiment of the present invention and, together with the description, serve to explain the principles of the invention. The drawings are not to be construed as limiting the invention.

DESCRIPTION OF THE PREFERRED EMBODIMENTS (BEST MODES FOR CARRYING OUT THE INVENTION)

Figure 1:
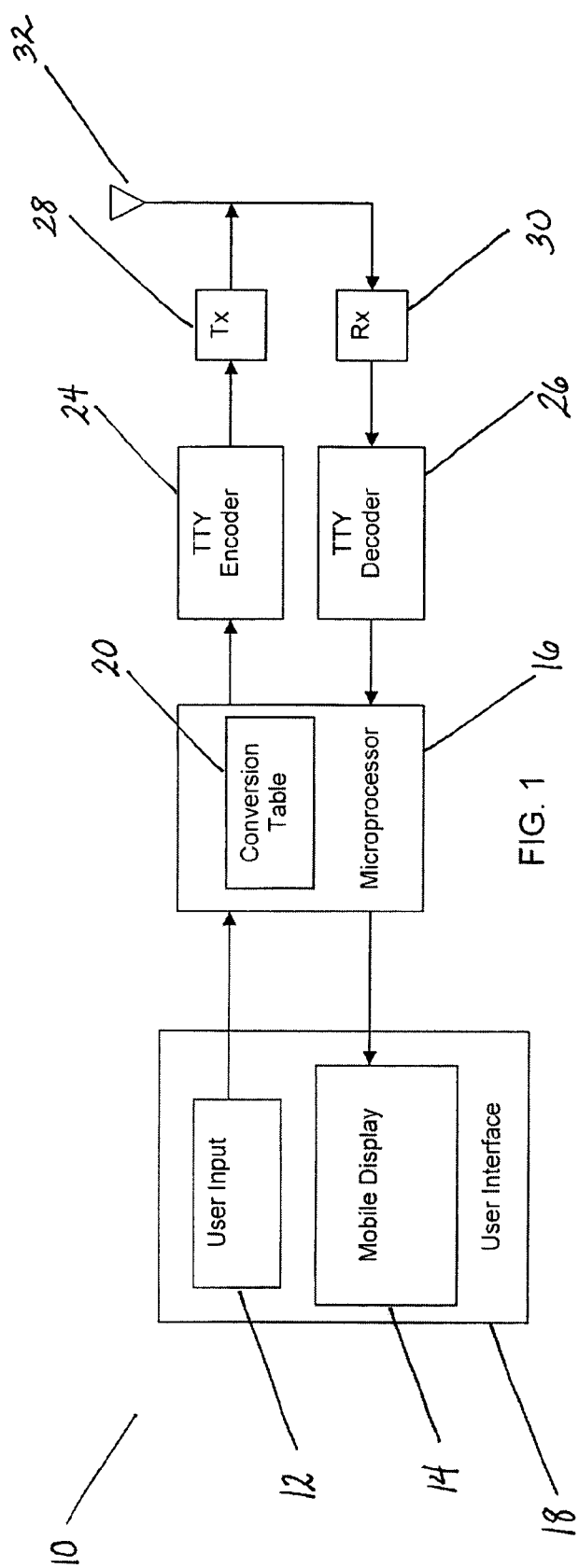
FIG. 1 is a block diagram of a preferred digital embodiment of the method and apparatus of the present invention for a mobile handset as a TTY device.
Figure 2:
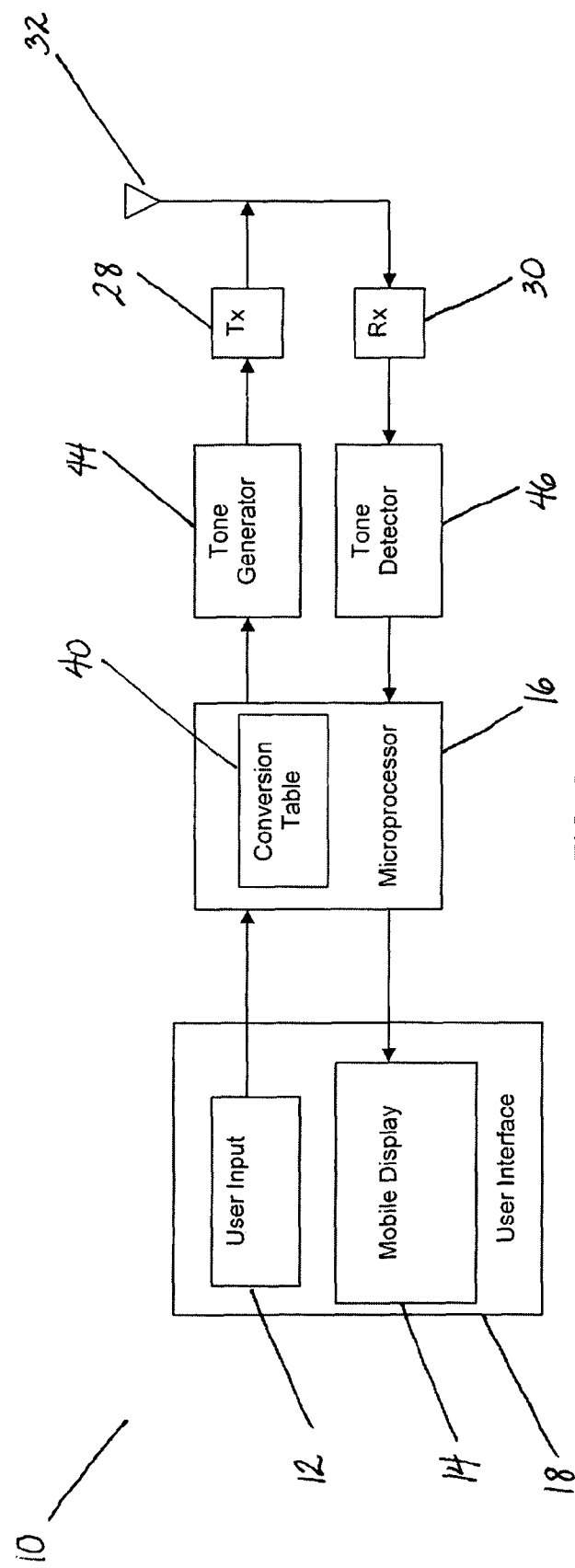
FIG. 2 is a block diagram of a preferred analog embodiment of the method and apparatus of the present invention for a mobile handset as a TTY device.

With reference to FIGS. 1 and 2, the present invention for a mobile handset 10 as a TTY device is shown. The mobile 10 of the present invention contains a conversion table stored in a memory associated with a microprocessor of mobile 10, this memory being part of the microprocessor or a memory external to the microprocessor. The conversion table contains the information necessary for converting between alphanumeric data and TTY formatted data. Mobile 10 also incorporates a suitable routine operating in the microprocessor to perform conversion from and to TTY formatted data upon receiving a command from the user that the mobile is to operate in "TTY mode". Upon receiving the command from a user to operate in TTY mode, the mobile performs the conversion from and to TTY formatted data in either an analog or digital format as appropriate for signal transmission and reception at the location of mobile 10.

Referring to FIG. 1, a block diagram of the preferred embodiment of the present invention for digital implementation of TTY capabilities into mobile handset 10 is shown. Components of mobile 10 shown in FIG. 1 include user interface depicted generally at 18 consisting of user input mechanism 12 such as a mobile alphanumeric keypad or stylus, and mobile display 14 such as a liquid crystal display (LCD), microprocessor 16, transmitter 28, receiver 30, and antenna 32.

A mobile user enters alphanumeric characters to microprocessor 16 through user input 12. As a user enters characters, the characters are displayed on mobile display 14. Display 14 also displays data that has been received by mobile 10. Microprocessor 16 controls mobile operations including user interaction—such as keypad decoding, modem operations, radio operations, control of the display of data to a user, control of storage mechanisms (memory) and control of other "peripheral" devices such as printers, scanners, digital cameras and other devices. Signals are encoded for transmission from mobile 10 and typically converted into an rf signal by transmitter 28 and transmitted from antenna 32. Signals are received by mobile 10 by antenna 32 and receiver 30 and decoded into data meaningful to a user.

When operating in digital mode, alphanumeric data received from user input 12 is encoded into TTY formatted data by microprocessor 16 in conjunction with conversion table 20 and TTY encoder 24. TTY encoder 24 attaches the appropriate TTY packet extension according to information stored in conversion table 20 so that the telecommunications base station and receiving mobile will interpret the incoming signal as a TTY formatted signal. The TTY formatted signal is then transmitted by transmitter 28 from mobile 10. All alphanumeric user-input data transmitted from mobile 10 is encoded in TTY format data until a command is entered into mobile 10 to cease operation in TTY mode. When operating in TTY mode, alphanumeric data input by a user is displayed on mobile display 14 so that the user can review the communication as it is being entered.

When mobile 10 receives a signal that is digitally TTY formatted, as indicated by the appropriate packet extension on the received signal, microprocessor 16 converts the TTY formatted data into alphanumeric data with decoder 26 operating in conjunction with conversion table 20. Once the data is converted from TTY to alphanumeric data, it is displayed on mobile display 14 to be read by the 20 receiving user.

Referring to FIG. 2, a block diagram of the preferred analog embodiment of the present invention for implementing TTY capabilities into mobile handset 10 is shown. Conversion table 40 is stored in a memory associated with microprocessor 16. Conversion table 40 provides the appropriate information for conversion between alphanumeric data and Baudot tone data for transmission from mobile 10 so that the telecommunications base station and receiving mobile will interpret the incoming signal from mobile 10 as a TTY formatted signal.

To operate mobile 10 in TTY mode, a user inputs a command via user input 12 to microprocessor 16. In analog mode a suitable routine operating in microprocessor 16 in conjunction with tone generator 44 and conversion table 40, converts data input by a user to a Baudot tone format for transmission from mobile 10. Once converted into Baudot tone format, the signal is transmitted by transmitter 28 of mobile 10 through mobile antenna 32 to a receiving mobile. Conversion of user-input alphanumeric data occurs until microprocessor receives a command input by a user to cease operation in TTY mode. As a user inputs alphanumeric data for conversion and transmission, the data is displayed on display 14.

When mobile 10 receives a Baudot tone formatted signal through antenna 32, as detected by tone detector 46, microprocessor 16 in conjunction with conversion table 40 converts the signal into alphanumeric data. Once converted into alphanumeric data, the data is displayed on display 14 to be read by the user.

Although the invention has been described with reference to these preferred digital and analog embodiments, other embodiments can achieve the same results. Variations and modifications of the present invention will be obvious to those skilled in the art and it is intended to cover in the appended claims all such modifications and equivalents.

What is claimed is:

1. A mobile communication device capable of two-way radio communication having teletypewriter (TTY) communication capability, said mobile communication device comprising:
    a microprocessor within the mobile communication device capable of converting between alphanumeric data and TTY formatted data;
    memory associated with said microprocessor;
    mobile user interface in communication with said microprocessor;
    conversion information stored in said memory for conversion between alphanumeric data and TTY formatted data; and
    a teletypewriter (TTY) tone detector circuitry for detecting TTY tone formatted data received by the mobile communication device, said TTY detector in communication with said microprocessor.

2. The mobile communication device of claim 1 wherein said user interface comprises:
    a display for the display of alphanumeric data to a user; and
    a user input mechanism.

3. The mobile communication device of claim 1 further comprising an encoder for encoding teletypewriter (TTY) packet extension data to a signal for transmission from the mobile communication device, said encoder in communication with said microprocessor.

4. The mobile communication device of claim 1 further comprising a decoder for decoding teletypewriter (TTY) formatted data received by the mobile communication device said decoder in communication with said microprocessor.

5. The mobile communication device of claim 1 further comprising a teletypewriter (TTY) tone generator for generating TTY tone formatted data for transmission from the mobile communication device, said TTY tone generator in communication with said microprocessor.

6. A method of transmitting teletypewriter (TTY) formatted data from a mobile communication device capable of two-way radio communication and comprising a microprocessor, TTY tone detection circuitry, and memory in which conversion information for conversion between alphanumeric data and TTY formatted data, the method comprising:
    in the microprocessor, accessing the conversion information for conversion between alphanumeric data and 117 formatted data in the memory;
    in the microprocessor, converting between alphanumeric data and TTY formatted data using the conversion information; and
    in the TTY tone detection circuitry, detecting TTY tone formatted data received by the mobile communication device with a TTY tone detector within the mobile communication device.

7. The method of claim 6 wherein the mobile communication device further comprises a display and wherein the method comprises displaying alphanumeric data that is input by a mobile user on the display.

8. The method of claim 6 the mobile communication device further comprises a display and wherein the method comprises:
    in the microprocessor, converting TTY formatted data received by the mobile communication device into alphanumeric data with the microprocessor; and
    displaying the alphanumeric data on the display of the mobile communication device.

9. The method of claim 8 wherein the step of converting teletypewriter (TTY) formatted data received by the mobile communication device into alphanumeric data further comprises decoding TTY formatted data received by the mobile communication device with a decoder within the mobile communication device.

10. The method of claim 6 wherein the mobile communication device further comprises a display and wherein the method comprises:
    converting between alphanumeric data and teletypewriter (TTY) formatted data comprises encoding TTY packet extension data to a signal for transmission from the mobile communication device within the mobile communication device.

11. The method of claim 6 wherein mobile communication device further comprises a display and wherein the method comprises:
    converting between alphanumeric data and teletypewriter (TTY) formatted data comprises generating TTY tone formatted data for transmission from the mobile communication device within the mobile communication device.

\* \* \* \* \*